United States Patent Office 3,032,971
Patented May 8, 1962

3,032,971
MIXTURES OF ACYCLIC POLYHYDROXY ALCOHOLS AND GLYCOL ETHERS AS ANTI-ICING ADDITIVES FOR HYDROCARBON FUELS
James A. Shotton, Bartlesville, Okla., assignor to Phillips Petroleum Company, a corporation of Delaware
No Drawing. Filed Oct. 20, 1961, Ser. No. 146,443
23 Claims. (Cl. 60—35.4)

This invention relates to anti-icing additives for hydrocarbon fuels. In one aspect this invention relates to a liquid hydrocarbon fuel having an anti-icing additive incorporated therein. In another aspect this invention relates to a method for operating a continuous combustion type power plant using said hydrocarbon fuel.

This application is a continuation-in-part of my copending application Serial No. 90,953, filed February 23, 1961, now abandoned, which in turn is a continuation-in-part of my copending application Serial No. 79, filed January 4, 1960, now abandoned.

The formation of ice within the fuel system of a jet aircraft has been recognized as a problem for a long time. Flights at high altitudes for long durations often result in the fuel being chilled to temperatures approaching that of the air in which the aircraft are operating. All jet fuel contains small amounts of dissolved and/or entrained water. When the fuel is chilled, the water separates from the fuel and ice is formed. Ice formation in an aircraft fuel system at points of restricted flow such as filters, screens, valves, orifices, etc., is a serious matter because the engine fuel supply may be restricted and certain instruments may not respond correctly. A number of engine flame-outs have been attributed to ice formation in the fuel system.

An obvious way to prevent fuel system icing is to keep the fuel dry. However, this is very difficult in view of different fuel sources and the large number of possibilities for contamination of the fuel with water during handling and in flight operations. In the operation of jet propelled aircraft, accumulation of water in the fuel cells or tanks occurs due to the extreme variations in temperature and pressure encountered at high and low altitudes, and also due to the constant variation in the level of fuel in said tanks caused by fuel consumption and fuel transfer from tank to tank to maintain proper distribution of load. In these variations of pressure, temperature, and fuel level, moisture carried into the fuel tanks with the air is condensed. The amount of water thus accumulated is sufficient to saturate the fuel (if it were not already saturated when delivered to the aircraft) and to settle as a separate phase in the fuel tanks.

Heretofore, the problem of icing in carburetors in automotive engines and the like has been encountered, leading to the phenomenon known as cold-stalling. Numerous fuel additives have been developed for solution of this problem and it would appear to be a rather obvious solution for the icing problem in jet aircraft to use an additive for the fuel which has been effective for prevention of cold-stalling. However, in the aircraft industry it is a common practice to coat the interior of the fuel cells with a resinous composition to protect the alloys used in their manufacture. It has been found that in such resin-coated fuel cells, some of the most efficient additives for prevention of cold-stalling attack the coating, causing it to soften and/or separate from the metal base. Under such circumstances, portions of the resin may be carried into fuel lines, screens, and filters and impede or block the flow of fuel to the engines.

I have discovered an anti-icing additive which comprises a blend of a saturated acyclic polyhydric alcohol (defined further hereinafter) and a glycol ether (defined further hereinafter), by the use of which additive the above-mentioned problems are eliminated or substantially reduced. Thus, broadly speaking, the present invention resides in (1) said anti-icing additive, (2) a liquid hydrocarbon fuel having a small but effective amount of said anti-icing additive incorporated therein and (3) a method of operating a jet engine using said liquid hydrocarbon fuel.

It was surprising and unexpected that said anti-icing additive comprising said blend of a polyhydric alcohol and a glycol ether is a much better anti-icing additive than either of (1) said polyhydric alcohol or (2) said glycol ether, when used alone. Thus, as clearly shown by the data given hereinafter, a synergistic effect is obtained when said polyhydric alcohol and said glycol ether are used in combination as an anti-icing additive.

Said combination anti-icing additive of the invention when incorporated in the fuel accomplishes at least two improvements in the operation of jet engines: (1) acts as an anti-icing agent and prevents plugging of the fuel system at points of restricted flow such as filters, valves, orifices, etc., due to ice formation and (2) eliminates or reduces deteriorating action on fuel tank coatings.

A further advantage of the fuel compositions of the invention lies in the ease with which a separate water phase can be removed from the fuel cells. In modern aircraft provision is made for drainage of such water phase through so-called "jiffy drains" situated at the bottom of the fuel cells. In cold climates and when operating with standard jet fuels alone, the water phase may be frozen solid, rendering such removal impossible without heating the fuel cells, a difficult and often hazardous procedure. However, when operating with the fuel compositions of the present invention, at least a portion of the additive migrates from the fuel composition to the water phase in a sufficient amount to prevent freezing of said water phase even at very low ambient temperatures.

An object of this invention is to provide an anti-icing additive suitable for use in a liquid hydrocarbon fuel. Another object of this invention is to provide an improved liquid hydrocarbon fuel having said anti-icing additive incorporated therein. Another object of this invention is to provide a method of operating a jet engine using said liquid hydrocarbon fuel having said anti-icing additive incorporated therein. Another object of this invention is to provide a method of operating a jet engine using said liquid hydrocarbon fuel having said anti-icing additive incorporated therein. Another object of this invention is to provide a method for the prevention of the formation of ice crystals in a continuous combustion power plant fuel system, which power plant is being operated at low temperatures. Another object of this invention is to provide a method for preventing the plugging of filters, orifices, valves and other points of restricted flow in a continuous combustion power plant fuel system when said power plant is operated at low temperatures. Other aspects, objects and advantages of the invention will be apparent to those skilled in the art in view of this disclosure.

Thus, according to the invention there is provided an anti-icing additive, suitable for use in a liquid hydrocarbon fuel, comprising a blend in synergistic proportions of (1) a saturated acyclic polyhydroxy alcohol containing from 3 to 5 carbon atoms, from 2 to 5 OH groups each attached to different carbon atoms and wherein the ratio of OH groups to carbon atoms is in the range of 0.66:1 to 1:1, and (2) a glycol ether having the formula $R(OCH_2CH_2)_xOH$ wherein: R is selected from the group consisting of a hydrogen atom, methyl, ethyl, propyl, butyl, phenyl, and tolyl groups; when R is hydrogen, $x$ is an integer of from 2 to 4; and when R is other than hydrogen, $x$ is an integer of from 1 to 4.

Further, according to the invention there is provided a liquid hydrocarbon fuel having said anti-icing additive incorporated therein in an amount within the range of from 0.01 to 1, preferably 0.01 to 0.5, more preferably 0.05 to 0.2 volume percent of said fuel. The amount of 0.1 volume percent gives excellent results.

Still further, according to the invention there is provided a method of operating a jet engine which comprises passing a liquid hydrocarbon fuel containing a small but effective amount of an anti-icing additive of the invention through the fuel supply system of said engine to a combustion zone of said engine, and burning said fuel.

As mentioned above, it was surprising and unexpected that a synergistic effect is obtained when said saturated acyclic polyhydric alcohol is used in combination with said glycol ether in the anti-icing additive of the invention. In the practice of the invention, a minor amount of said alcohol is employed in combination with a major amount of said ether. Suitable proportions for said alcohol and said ether in the anti-icing additive are usually from 0.5 to 49 weight percent of the said alcohol and from 99.5 to 51 weight percent of said ether. A presently more preferred range is from 1 to 40 weight percent of said alcohol and from 99 to 60 weight percent of said ether. A still more preferred range is from 1 to 10 weight percent of said alcohol and 99 to 90 weight percent of said ether.

The above proportions of said alcohol and said ether in the anti-icing additives of the invention represent presently preferred proportions. However, it has been disclosed and claimed in said copending parent application Serial No. 79, filed January 4, 1960, now abandoned, that suitable proportions for the anti-icing additive of the invention are usually from 6 to 50 weight percent of said alcohol and from 50 to 94 weight percent of said ether. Thus obviously the broadest ranges for said alcohol and for said ether in the anti-icing additive of the invention are from about 0.5 to about 49 or 50 weight percent of said alcohol and from about 99.5 to about 51 or 50 weight percent of said ether. Said ranges of 6 to 50 weight percent of said alcohol and 50 to 94 weight percent of said ether, being included within said broadest ranges, are obviously suitable proportions for the anti-icing additives of the invention as disclosed and claimed in the present application. In all instances the amount of said alcohol used in the anti-icing additives of the invention is an amount sufficient to synergistically increase the anti-icing properties of the additive when it is added to said fuel.

Examples of saturated acyclic polyhydroxy alcohols which can be used in the practice of the invention include the following: 1,2-dihydroxypropane; 1,3-dihydroxypropane; glycerol; 1,2,3-trihydroxybutane; 1,2,4-trihydroxybutane; 2-(hydroxymethyl)-1,3-dihydroxypropane; erythritol; pentaerythritol; 1,2,3,4-tetrahydroxypentane; 1,2,3,5-tetrahydroxypentane; 1,2,4,5-tetrahydroxypentane; 2-(hydroxymethyl)-1,3,4-trihydroxybutane; and 1,2,3,4,5-pentahydroxypentane.

A presently preferred group of polyhydroxy alcohols are: glycerol; 1,2,3-trihydroxybutane; 1,2,4-trihydroxybutane; and erythritol. Glycerol is the presently most preferred polyhydroxy alcohol.

Examples of said glycol ethers which can be used in the practice of the invention include, among others, the following: methyl ether of ethylene glycol (methyl Cellosolve); ethyl ether of ethylene glycol (ethyl Cellosolve); butyl ether of ethylene glycol (butyl Cellosolve); methyl ether of diethylene glycol (methyl Carbitol); ethyl ether of diethylene glycol (ethyl Carbitol); butyl ether of diethylene glycol (butyl Carbitol); methyl ether of triethylene glycol; ethyl ether of triethylene glycol, phenyl ether of ethylene glycol; tolyl ether of ethylene glycol; phenyl ether of diethylene glycol; tolyl ether of diethylene glycol; phenyl ether of triethylene glycol; tolyl ether of triethylene glycol; diethylene glycol; triethylene glycol; and tetraethylene glycol.

A presently preferred group of glycol ethers suitable for use in the practice of the invention are those having the formula $R(OCH_2CH_2)_xOH$ wherein: R is selected from the group consisting of methyl, ethyl, propyl, and butyl groups, and $x$ is an integer of from 1 to 4. The most preferred glycol ethers are those of the above formula wherein R is methyl or ethyl and $x$ is 1 or 2.

The following examples will serve to further illustrate the invention.

EXAMPLE I

In the engine fuel supply system of a jet aircraft the points which most frequently plug due to ice formation are the fuel filters. Thus the filter plugging characteristics of a jet-engine fuel containing an anti-icing additive are a good measure of the effectiveness of said additive as an anti-icing agent.

The filter plugging characteristics of a jet-engine fuel are tested by a procedure and employing apparatus designed particularly for this purpose. The apparatus consists essentially of a fuel reservoir system designed to supply the fuel at a constant rate to an enclosed filter cell element immersed in a constant temperature bath. Said filter cell is provided with an inlet positioned above an outlet having an effective area of 1.0 square centimeter. The filter used across said outlet is a 10 micron filter paper, Catalogue No. 74698, Precision Scientific Company. If desired, stainless steel filters of 200–300 mesh can be used instead of said filter paper. It has been found that using said 10 micron paper affords a more severe test than said 200 mesh screen. A manometer is provided to measure the pressure drop across the filter.

The fuel to be tested is admitted to the filter cell element through a copper coil so constructed that said coil and said cell element can be completely immersed in said constant temperature bath. Said coil provides for quick chilling of the fuel to the desired predetermined temperature. A thermocouple is provided for measuring the temperature of the fuel entering the filter cell. When the temperature of the cooling medium in the constant temperature bath has reached the desired predetermined temperature the flow of fuel to be tested is started. The filtrate is received in a graduated cylinder and pressure drop readings are taken for each 10 milliliters filtered so that a curve relating pressure drop across the filter and volume filtered can be plotted. A test is completed by filtering 1000 ml. of sample or reaching a pressure drop across the filter of 260 mm. of mercury (approximately 5 pounds), whichever occurs first. In this test method the filter can be considered to be plugged when the pressure drop reaches 260 mm. of mercury.

Filtration tests at −40° F. were conducted employing the jet fuel described hereinafter and which had been saturated with water at 75° F., and said water saturated jet fuel to which had been added various anti-icing additives. The results of said tests are set forth in Table I below.

Table I

| Run No. | Additive concentration, vol. percent | Additive composition, weight percent | | Volume filtered, ml. | Pressure drop, mm. Hg. |
|---|---|---|---|---|---|
| | | Ethylene glycol monomethyl ether | Glycerol | | |
| 1 | 0.0 | | | 139 | 260 |
| 2 | 0.025 | 100 | | 850 | 260 |
| 3 | 0.025 | | 100 | 390 | 260 |
| 4 | 0.025 | 90 | 10 | 1,000 | 100 |
| 5 | 0.025 | 75 | 25 | 1,000 | 68 |
| 6 | 0.025 | 50 | 50 | 1,000 | 42 |
| 7 | 0.010 | 100 | | 592 | 260 |
| 8 | 0.010 | | 100 | 282 | 260 |
| 9 | 0.010 | 90 | 10 | 789 | 260 |
| 10 | 0.010 | 98 | 2 | 958 | 260 |
| 11 | 0.010 | 99 | 1 | 1,000 | 218 |

It is apparent from the above data a synergistic effect is obtained when ethylene glycol monomethyl ether and glycerol are used in combination as an anti-icing additive in accordance with the invention. A comparison of Runs 4, 5, and 6 with Runs 2 and 3 shows that the blends of ethylene glycol monomethyl ether and glycerol are superior to either the ethylene glycol monomethyl ether alone or the glycerol alone, all additives being tested at the same concentration.

A comparison of Runs 7, 8 and 9 shows that even though the maximum pressure drop was reached in all three runs, the amount filtered in Run No. 9 is much greater when using the combination additive of the invention than when using either of the individual component additives alone as in Runs 7 and 8. All additives were again tested at the same concentration and the results again clearly show the unexpected synergistic effect obtained when using the combination additive of the invention.

EXAMPLE II

Actual flight tests in a B-52 jet aircraft have demonstrated the practical value of the anti-icing additives of the invention. In these tests the basic flight test procedure was to fly the aircraft at an altitude of 40,000 to 45,000 feet until the bulk fuel temperature in the fuel tanks had decreased to at least $-20°$ F. or lower. Six flight tests of an average duration of 10 to 12 hours were made.

In three of said tests the No. 1 engine was not protected by a heater in the fuel system and was supplied from No. 1 main tank with JP-4 fuel containing approximately 100 parts per million of water. Engine Nos. 2, 3 and 4 were protected by fuel system heaters and were supplied from No. 2 main tank with JP-4 fuel containing approximately 100 parts per million of water. The remaining four engines, Nos. 5, 6, 7 and 8, were not protected with fuel system heaters. Engines Nos. 5 and 6 were supplied from No. 3 main fuel tank with JP-4 fuel containing approximately 100 parts per million of water and, in accordance with the invention, also containing 0.1 volume percent of an anti-icing additive consisting essentially of a blend of about 90 weight percent ethylene glycol monomethyl ether and about 10 weight percent glycerol. Engines Nos. 7 and 8 were supplied from No. 4 main tank with JP-4 fuel containing approximately 100 parts per million of water and, in accordance with the invention, also containing 0.1 volume percent of an anti-icing additive consisting essentially of a blend of about 90 weight percent diethylene glycol monomethyl ether and about 10 weight percent glycerol.

In the remaining three flight tests the test conditions were the same as said first three flight tests except that the fuel in main tanks 1, 3 and 4 had excess water in the amount of 2 milliliters per gallon added thereto.

Repeated fuel flow interruptions and flame-outs were experienced on No. 1 engine throughout said flight tests. The remainder of the engines functioned in normal manner. After each flight the fuel system screens were removed immediately upon landing. Ice was found on said screens and it was established that fuel system ice was responsible for the failures of No. 1 engine. No ice was found in the fuel systems of the other engines.

It was also found that the water drain valves on main fuel tanks 1 and 2 (fuel contained no additive) were frozen whereas the drain valves on main fuel tanks 3 and 4 (fuel contained additive) were free and clear.

EXAMPLE III

Tests were made to determine the pumpability at $-76°$ F. of (1) a JP-4 jet fuel which had been saturated with water at $75°$ F., (2) said fuel to which there had been added 12 ml. per gallon of excess water and (3) said water saturated fuel to which there had been added an anti-icing additive consisting essentially of 90 weight percent of ethylene glycol monomethyl ether and 10 weight percent glycerol. These tests were made in an apparatus like that described in Example I except that a 200 mesh stainless steel filter screen like that employed in commercial jet engines was employed in the filter cell.

In a control run, said water saturated JP-4 jet fuel showed an initial pressure change at $8°$ F., and when the temperature was decreased further to $6°$ F. the flow through the system was approximately zero.

In another control run excess water was added to said water saturated JP-4 jet fuel in an amount of 12 milliliters per gallon. In this run the initial pressure change was observed at $26°$ F., and when the temperature was decreased further to $23°$ F., flow through the system was approximately zero.

In a test run using said water saturated JP-4 jet fuel to which there had been added 0.025 volume percent of an anti-icing blend according to the invention consisting essentially of 90 weight percent of ethylene glycol monomethyl ether and 10 weight percent of glycerol, the pumpability of the fuel was 100 percent at $-76°$ F.

This example shows that the anti-icing additives of the invention will serve to protect the fuel system of a jet engine or other continuous combustion type power plant, even when operated at temperatures as low as $-76°$ F.

EXAMPLE IV

A series of aluminum alloy coupons measuring 1" x 6", coated with different blends of Buna N (butadiene-acrylonitrile copolymer) and a phenolic resin dissolved in a solvent were evaluated in a series of tests to determine the effect of various concentrations of a blend containing 90 weight percent of ethylene glycol monomethyl ether and 10 weight percent glycerol in JP-4 jet fuel on the coatings. Duplicate coupons A and B were prepared from each coating material and tested as follows. The fuel blends were placed in glass jars in an amount such that when a coupon was placed in a jar it was about half immersed. The jars containing the coupons were then maintained in an oven at $140°$ F. for 14 days, the solutions being changed each day to simulate refilling of tanks in an aircraft.

Three types of evaluation were used in these tests. The first evaluation, a thumb-rubbing test was made daily. This test was qualitative only but capable of showing development of tackiness or softening of the coating. In this test all coatings were satisfactory.

The second evaluation was a pencil hardness test, made on each coupon at the end of the 14 day period. In this test, the coated surface of the coupon was marked with a pencil (A. W. Faber, Castell No. 9000) and the hardest lead that could be drawn across the coating without scratching is recorded as the pencil hardness. In this series, the hardness is designated on a scale from 1 to 20, in ascending order, based on A. W. Faber, Castell No. 9000 pencil hardness scale as follows:

| | | | |
|---|---|---|---|
| 1=8B | 6=3B | 11=H | 16=6H |
| 2=7B | 7=2B | 12=2H | 17=7H |
| 3=6B | 8=B | 13=3H | 18=8H |
| 4=5B | 9=HB | 14=4H | 19=9H |
| 5=4B | 10=F | 15=5H | 20=10H |

The third evaluation, made at the end of the test period, was the Scotch tape test. The coating was scratched transversely with a steel scriber after which a piece of Scotch tape was pressed firmly on the film and then pulled away. Softened or weakly adherent films are removed with the tape. Pencil hardness and Scotch tape tests yielded the data shown in Table II, below.

Table II

| Run No. | Liquid tested composition and LV, Percent | Coating No. 1 | | | | Coating No. 2 | | | |
|---|---|---|---|---|---|---|---|---|---|
| | | Coupon A | | Coupon B | | Coupon A | | Coupon B | |
| | | Pencil hardness | Scotch tape | Pencil hardness | Scotch tape | Pencil hardness | Scotch tape | Pencil hardness | Scotch tape |
| 1 | JP-4 jet fuel, 100% | 13 | OK | 12 | OK | 13 | OK | 13 | OK. |
| 2 | JP-4+0.05% Me Cellosolve [1] | 13 | OK | 12 | OK | 13 | OK | 13 | OK. |
| 3 | JP-4+0.05% mixture [2] | 13 | OK | 12 | OK | 13 | OK | 12 | OK. |
| 4 | JP-4+0.10% Me Cellosolve | 12 | OK | 12 | OK | 12 | OK | 13 | OK. |
| 5 | JP-4+0.10% mixture [2] | 13 | OK | 12 | OK | 13 | OK | 13 | OK. |
| 6 | JP-4+0.50% Me Cellosolve | 13 | OK | 13 | OK | 13 | OK | 11 | OK. |
| 7 | JP-4+0.50% mixture [2] | 13 | OK | 13 | OK | 13 | OK | 11 | OK. |

[1] Me Cellosolve = ethylene glycol monomethyl ether.
[2] Methyl cellosolve-glycerol blend at 90/10 ratio as set forth above.

This example shows that fuels containing either or both components of the additive are not detrimental to the coatings.

EXAMPLE V

Since in service, a water phase is frequently established in the fuel cells of a jet operated aircraft, and since one of both of the components of the additive blend of the invention migrates at least partially to the water phase, a series of tests was run in which duplicate coupons coated with the coatings of Example IV were immersed in water containing methyl Cellosolve, water containing glycerol, and water containing the 90/10 mixture of methyl Cellosolve and glycerol. The liquid was maintained at 140° F. and the tests were run for 14 days. Pencil hardness and Scotch tape tests were made at the end of the test period. Data from these tests are presented in Table III below.

EXAMPLE VI

A series of tests made in the manner described in Example IV was run, the liquid being a two phase system, a hydrocarbon phase (JP-4) containing 0.5 percent additive, and a water phase containing 50 percent additive. Solutions were changed daily. Tests were made on the coupons on the areas exposed to each phase. Data are shown in Table IV below.

Table IV

| Run No. | Liquid tested composition and LV, Percent | Coating No. 1 | | | | Coating No. 2 | | | |
|---|---|---|---|---|---|---|---|---|---|
| | | Coupon A | | Coupon B | | Coupon A | | Coupon B | |
| | | Pencil hardness | Scotch tape | Pencil hardness | Scotch tape | Pencil hardness | Scotch tape | Pencil hardness | Scotch tape |
| 1 | JP-4+0.5% Me Cellosolve | 13 | OK | 12 | OK | 13 | OK | 12 | OK. |
| 2 | Water+50% Me Cellosolve | 11 | OK | 5 | OK | 11 | OK | 11 | OK. |
| 3 | JP-4+0.5% mixture [1] | 14 | OK | 11 | OK | 13 | OK | 11 | OK. |
| 4 | Water+50% mixture [1] | 8 | OK | 7 | OK | 8 | OK | 12 | OK. |

[1] Methyl cellosolve-glycerol blend in 90/10 ratio as set forth above.

The above data, when compared with Runs 1 and 7 of Table II and Run 1 of Table III above, show that in two phase systems the combination additives of the invention are not detrimental to the coating materials.

EXAMPLE VII

Another series of tests was made in the manner described in Example IV except that the tests were run for a 17 day period. This series of tests was run to again Table III

| Run No. | Liquid tested composition and LV, Percent | Coating No. 1 | | | | Coating No. 2 | | | |
|---|---|---|---|---|---|---|---|---|---|
| | | Coupon A | | Coupon B | | Coupon A | | Coupon B | |
| | | Pencil hardness | Scotch tape | Pencil hardness | Scotch tape | Pencil hardness | Scotch tape | Pencil hardness | Scotch tape |
| 1 | Water, 100% | 10 | OK | 7 | OK | 8 | Sl. loss | 7 | Sl. loss. |
| 2 | Water+25% Me Cellosolve | 6 | OK | 4 | OK | 3 | OK | 3 | OK. |
| 3 | Water+50% Me Cellosolve | 5 | Sl. loss | 6 | Sl. loss | 8 | OK | 6 | OK. |
| 4 | Water+25% glycerol | 10 | OK | 9 | OK | 11 | OK | 8 | OK. |
| 5 | Water+50% glycerol | 10 | OK | 9 | OK | 11 | OK | 9 | OK. |
| 6 | Water+75% glycerol | 12 | OK | 11 | OK | 12 | OK | 11 | OK. |
| 7 | Glycerol, 100% | 13 | OK | 13 | OK | 13 | OK | 11 | OK. |
| 8 | Water+25% mixture | 8 | OK | 7 | OK | 3 | OK | 3 | OK. |
| 9 | Water+50% mixture | 6 | OK | 5 | Sl. loss | 14 | OK | 14 | OK. |

These tests are considered unusually severe because all the concentrations of the various additives in water are believed to be much greater than would be encountered in actual service when the combination additives of the invention are being added to the fuel in amounts of 0.01 to 1 volume percent.

simulate the conditions caused by the migration of the components of the combination additives of the invention into the water phase in the fuel cells or tanks of the aircraft when in service. The tests were run in triplicate using coupons coated with either coating composition No. 3 or coating composition No. 4. Said coating compositions Nos. 3 and 4 were of the same general type as coating compositions No. 1 and 2 of Examples III, IV and V. In carrying out the tests the coated coupons were immersed in water, and in a test solution containing 25 volume percent methyl Cellosolve, 30 volume percent glycerol, and 45 volume percent water. Results of the tests are given in Table V below.

The results of the above tests show that no deterioration in hardness occurred during the 60-day test period and that with fuel blends Nos. 2 and 3 the hardness of the coating increased during the test period.

EXAMPLE IX

Another series of runs was made in the manner described in Example V. This series of tests was run to again determine the effect of a water phase containing the additives of the invention, or ethylene glycol monomethyl ether on the tank coating materials. The tests were run in triplicate using aluminum coupons coated with the same coating composition No. 1. The test period was 14 days after which the test was discontinued. Pencil hardness tests at the end of the 14-day test period are given in Table VII below:

Table V

| Run No. | Liquid tested composition LV, percent | Coating No. 3 | | | | | | Coating No. 4 | | | | | |
|---|---|---|---|---|---|---|---|---|---|---|---|---|---|
| | | Coupon A | | Coupon B | | Coupon C | | Coupon A | | Coupon B | | Coupon C | |
| | | Pencil hardness | Scotch tape | Pencil hardness | Scotch tape | Pencil hardness | Scotch tape | Pencil hardness | Scotch tape | Pencil hardness | Scotch tape | Pencil hardness | Scotch tape |
| 1 | Water, 100% | 6 | OK | 7 | OK | 8 | OK | 7 | NG | 5 | NG | 5 | OK. |
| 2 | Water, 45%; Me Cello., 25%; glycerol, 30%. | 10 | OK | 10 | OK | 9 | OK | 9 | OK | 9 | OK | 9 | OK. |

The above data show that the only coating failure occurred in water alone. The coating on all coupons in Run No. 2 were tight and in excellent condition. A comparison of Run No. 1 with Run No. 2 shows that with all coupons the condition of the coupons in Run No. 2 was superior to the condition of the coupons in Run No. 1.

EXAMPLE VIII

Another series of tests was made in the manner described in Example IV except that the tests were run for a 60-day period. This series of tests was run to again determine the effect of JP-4 fuel containing additives of the invention on the tank coating materials. The tests were run in triplicate using aluminum coupons coated with coating composition No. 1 or coating composition No. 2. Three additive blends were prepared having compositions as follows:

(A) 87.3 weight percent ethylene glycol monomethyl ether 12.7 weight percent glycerol
(B) 93.6 weight percent ethylene glycol monomethyl ether 6.4 weight percent glycerol
(C) 97.4 weight percent ethylene glycol monomethyl ether 2.6 weight percent glycerol.

Three fuel blends, No. 1, No. 2, and No. 3, of JP-4 jet fuel containing 0.1 volume percent of said additives A, B, and C respectively were prepared. The JP-4 jet fuel used had essentially the same properties as that used in Example IV. Three aluminum coupons coated with coating composition No. 1 and three aluminum coupons coated with coating composition No. 2 were placed in each of three one-quart containers and said fuel blends were added thereto in an amount such that the coupons were semi-immersed. The thus prepared containers were placed in an oven maintained at 140° F. Fresh fuel blend was added daily for a few days, then semi-weekly, and finally at two week intervals. The coatings were tested for pencil hardness periodically over a period of two months. Results of these tests are summarized in Table VI below:

Table VI

| Elapsed time, days | Fuel No. 1 | | Fuel No. 2 | | Fuel No. 3 | |
|---|---|---|---|---|---|---|
| | Coating No. 1 | Coating No. 2 | Coating No. 1 | Coating No. 2 | Coating No. 1 | Coating No. 2 |
| 2 | 15 | 15 | 14 | 12 | 12 | 11 |
| 5 | 16 | 15 | 15 | 14 | 12 | 10 |
| 8 | 16 | 15 | 14 | 14 | 13 | 12 |
| 10 | 16 | 14 | 16 | 14 | 15 | 13 |
| 14 | 16 | 15 | 15 | 14 | 14 | 13 |
| 20 | 16 | 15 | 16 | 15 | 15 | 14 |
| 22 | 15 | 15 | 15 | 15 | 15 | 15 |
| 60 | 14 | 15 | 15 | 15 | 15 | 15 |

Table VII

| Liquid tested composition and LV, percent | Pencil hardness after 14 days (average of 3 tests) |
|---|---|
| 25% additive mixture No. 1,[1] 75% water | 7 |
| 25% additive mixture No. 2,[2] 75% water | 7 |
| 25% additive mixture No. 3,[3] 75% water | 7 |
| 25% ethylene glycol monomethyl ether, 75% water | 4 |

[1] Additive No. 1=97.4 weight percent ethylene glycol monomethyl ether, 2.6 weight percent glycerol.
[2] Additive No. 2=98.7 weight percent ethylene glycol monomethyl ether, 1.3 weight percent glycerol.
[3] Additive No. 3=99.35 weight percent ethylene glycol monomethyl ether, 0.65 weight percent glycerol.

The above data shows that the use of as little as 0.65 weight percent of glycerol in the additive of the invention effects a marked improvement over the use of ethylene glycol monomethyl ether alone.

The JP-4 jet fuel used in the above Examples I, III, IV, and VI had the following physical properties:

Reid vapor pressure _____ 2.20
A.P.I. gravity _____ 53.5

Distillation, °F.

| | | | |
|---|---|---|---|
| I.B.P. | 138 | 60 | 347 |
| 5 | 220 | 70 | 363 |
| 10 | 251 | 80 | 383 |
| 15 | 268 | 90 | 417 |
| 20 | 278 | 95 | 445 |
| 30 | 300 | EP | 473 |
| 40 | 319 | Rec | 99 |
| 50 | 326 | Res | 1 |

Said fuel complied fully with all other specifications for a JP-4 jet fuel, including the freezing point specification maximum of −76° F. As is known to those skilled in the art, this freezing point specification is provided to insure that plugging of the fuel system will not occur due to freezing of the fuel itself at the low temperatures existing at the high altitudes at which jet aircraft operate.

Any suitable type of hydrocarbon fuel can be employed in the practice of the invention. Said fuels which can be so employed include the conventional jet engine fuels which comprise a blend of hydrocarbons boiling in the range from about 100 to about 700° F., such as gas oils, kerosene, and gasolines, including aviation gasoline. Fuels of the paraffin and naphthenic type having relatively low aromatic content, i.e., not more than about 20 liquid volume percent aromatics, as well as fuels of the aromatic type having high aromatic contents ranging from about 20 up to about 88 percent or higher liquid volume percent aromatics, can be used in operating continuous combustion turbo type aircraft engines according to the practice of the invention. Hydrocarbon fuels having wide boiling range, such as JP-3, JP-4, or fuels of the kerosene type, such as JP-5, can be employed, the boiling range of these fuels generally being in the range of about 200 to about 600° F.

Thus, while the invention has been described herein with particular reference to jet engine fuels, more specifically JP-4 jet engine fuel, the invention is not limited thereto. The invention can be used with all grades of jet engine fuels. The anti-icing additive of the invention can also be used with advantage in gasolines for reciprocating engines and in diesel fuels for compression-ignition engines.

The hydrocarbon fuel compositions of the invention containing an anti-icing additive of the invention may also contain commonly used other additives such as anti-corrosion agents, oxidation inhibitors, and the like.

As used herein and in the claims, unless otherwise specified, the terms "jet engine" and "jet engine fuel" refer to and include turbo-prop, turbo-jet, ramjet and pulse jet engines, and fuels designed to be used in said engines.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. An anti-icing additive, suitable for use in a liquid hydrocarbon fuel, comprising a blend of
   from 0.5 to about 50 weight percent of glycerol; and
   from 99.5 to about 50 weight percent of a glycol ether having the formula $R(OCH_2CH_2)_xOH$ wherein: R is selected from the group consisting of a hydrogen atom, methyl, ethyl, propyl, butyl, phenyl, and tolyl groups; when R is hydrogen, $x$ is an integer of from 2 to 4; and when R is other than hydrogen, $x$ is an integer of from 1 to 4.

2. An anti-icing additive, suitable for use in a liquid hydrocarbon fuel, comprising a blend of
   from 0.5 to about 50 weight percent of glycerol and
   from 99.5 to about 50 weight percent of ethylene glycol monomethyl ether.

3. An anti-icing additive, suitable for use in a liquid hydrocarbon fuel, comprising a blend of
   from 0.5 to about 50 weight percent of glycerol and
   from 99.5 to about 50 weight percent of diethylene glycol monomethyl ether.

4. An anti-icing additive, suitable for use in a liquid hydrocarbon fuel, consisting essentially of a blend of
   from 1 to about 10 weight percent of glycerol and
   from 99 to about 90 weight percent of ethylene glycol monomethyl ether.

5. An anti-icing additive, suitable for use in a liquid hydrocarbon fuel, consisting essentially of a blend of
   from 1 to about 10 weight percent of glycerol and
   from 99 to about 90 weight percent of diethylene glycol monomethyl ether.

6. A liquid hydrocarbon fuel containing from 0.01 to 1 volume percent of an anti-icing additive comprising a blend of
   from 0.5 to about 50 weight percent of glycerol and
   from 99.5 to about 50 weight percent of a glycol ether having the formula $R(OCH_2CH_2)_xOH$ wherein: R is selected from the group consisting of a hydrogen atom, methyl, ethyl, propyl, butyl, phenyl, and tolyl groups; when R is hydrogen, $x$ is an integer of from 2 to 4; and when R is other than hydrogen, $x$ is an integer of from 1 to 4.

7. A liquid hydrocarbon fuel containing from 0.01 to 1 volume percent of an anti-icing additive comprising a blend of
   from 0.5 to about 50 weight percent of glycerol and
   from 99.5 to about 50 weight percent of ethylene glycol monomethyl ether.

8. A liquid hydrocarbon fuel containing from 0.01 to 1 volume percent of an anti-icing additive comprising a blend of
   from 0.5 to about 50 weight percent of glycerol and
   from 99.5 to about 50 weight percent of diethylene glycol monomethyl ether.

9. A liquid hydrocarbon fuel containing from 0.01 to 1 volume percent of an anti-icing additive comprising a blend of
   from 1 to about 10 weight percent of glycerol and
   from 99 to about 90 weight percent of ethylene glycol monomethyl ether.

10. A liquid hydrocarbon fuel containing from 0.01 to 1 volume percent of an anti-icing additive comprising a blend of
    from 1 to about 10 weight percent of glycerol and
    from 99 to about 90 weight percent of diethylene glycol monomethyl ether.

11. In a method of operating a jet engine which encounters subfreezing temperatures, said engine being equipped with a fuel supply system which is subject to becoming plugged by ice formation at said subfreezing temperatures due to the presence of water in the fuel, the step of passing through said fuel supply system to a combustion zone of said engine a liquid hydrocarbon fuel containing from 0.01 to 1 volume percent of an anti-icing additive comprising a blend of
    from 0.5 to about 50 weight percent of a saturated acyclic polyhydroxy alcohol containing from 3 to 5 carbon atoms, from 2 to 5 OH groups each attached to a different carbon atom and wherein the ratio of OH groups to carbon atoms is in the range of 0.66:1 to 1:1; and
    from 99.5 to about 50 weight percent of a glycol ether having the formula $R(OCH_2CH_2)_xOH$ wherein: R is selected from the group consisting of a hydrogen atom, methyl, ethyl, propyl, butyl, phenyl, and tolyl groups; when R is hydrogen, $x$ is an integer of from 2 to 4; and when R is other than hydrogen, $x$ is an integer of from 1 to 4.

12. In the method of operating a jet engine which encounters subfreezing temperatures, said engine being equipped with a fuel supply system which is subject to becoming plugged by ice formation at said subfreezing temperatures due to the presence of water in the fuel, the step of passing through said fuel supply system to a combustion zone of said engine a liquid hydrocarbon fuel containing from 0.01 to 1 volume percent of an anti-icing additive comprising as its sole essential ingredients a blend of
    from 1 to about 40 weight percent of a saturated acyclic polyhydroxy alcohol containing from 3 to 5 carbon atoms, from 2 to 5 OH groups each attached to a different carbon atom and wherein the ratio of OH groups to carbon atoms is in the range of 0.66:1 to 1:1; and
    from 99 to about 60 weight percent of a glycol ether having the formula $R(OCH_2CH_2)_xOH$ wherein: R is selected from the group consisting of a hydrogen atom, methyl, ethyl, propyl, butyl, phenyl, and tolyl groups; when R is hydrogen, $x$ is an integer of from 2 to 4; and when R is other than hydrogen, $x$ is an integer of from 1 to 4.

13. In the method of operating a jet engine which encounters subfreezing temperatures, said engine being equipped with a fuel supply system which is subject to becoming plugged by ice formation at said subfreezing temperatures due to the presence of water in the fuel, the step of passing through said fuel supply system to a combustion zone of said engine a liquid hydrocarbon fuel containing from 0.01 to 1 volume percent of an anti-icing additive comprising a blend of from 6 to about 50 weight percent of a saturated acyclic polyhydroxy alcohol containing from 3 to 5 carbon atoms, from 2 to 5 OH groups each attached to a different carbon atom and wherein the ratio of OH groups to carbon atoms is in the range of 0.66:1 to 1:1; and from 94 to about 50 weight percent of a glycol ether having the formula $R(OCH_2CH_2)_xOH$ wherein: R is selected from the group consisting of a hydrogen atom, methyl, ethyl, propyl, butyl, phenyl, and tolyl groups; when R is hydrogen, $x$ is an integer of from 2 to 4; and when R is other than hydrogen, $x$ is an integer of from 1 to 4.

14. In the method of operating a jet engine which encounters subfreezing temperatures, said engine being equipped with a fuel supply system which is subject to becoming plugged by ice formation at said subfreezing temperatures due to the presence of water in the fuel, the step of passing through said fuel supply system to a combustion zone of said engine a liquid hydrocarbon fuel containing from 0.01 to 1 volume percent on an anti-icing additive comprising a blend of from 1 to about 10 weight percent of a saturated acyclic polyhydroxy alcohol containing from 3 to 5 carbon atoms, from 2 to 5 OH groups each attached to a different carbon atom and wherein the ratio of OH groups to carbon atoms is in the range of 0.66:1 to 1:1; and from 99 to about 90 weight percent of a glycol ether having the formula $R(OCH_2CH_2)_xOH$ wherein: R is selected from the group consisting of a hydrogen atom, methyl, ethyl, propyl, butyl, phenyl, and tolyl groups; when R is hydrogen, $x$ is an integer of from 2 to 4; and when R is other than hydrogen, $x$ is an integer of from 1 to 4.

15. In the method of operating a jet engine which encounters subfreezing temperatures, said engine being equipped with a fuel supply system which is subject to becoming plugged by ice formation at said subfreezing temperatures due to the presence of water in the fuel, the step of passing through said fuel supply system to a combustion zone of said engine a liquid hydrocarbon fuel containing from 0.01 to 1 volume percent of an anti-icing additive comprising a blend of about 10 weight percent of a saturated acyclic polyhydroxy alcohol containing from 3 to 5 carbon atoms, from 2 to 5 OH groups each attached to a different carbon atom and wherein the ratio of OH groups to carbon atoms is in the range of 0.66:1 to 1:1, and from about 90 weight percent of a glycol ether having the formula $R(OCH_2CH_2)_xOH$ wherein: R is selected from the group consisting of a hydrogen atom, methyl, ethyl, propyl, butyl, phenyl, and tolyl groups; when R is hydrogen, $x$ is an integer of from 2 to 4; and when R is other than hydrogen, $x$ is an integer of from 1 to 4.

16. In the method of operating a jet engine which encounters subfreezing temperatures, said engine being equipped with a fuel supply system which is subject to becoming plugged by ice formation at said subfreezing temperatures due to the presence of water in the fuel, the step of passing through said fuel supply system to a combustion zone of said engine a liquid hydrocarbon fuel containing from 0.01 to 1 volume percent of an anti-icing additive comprising a blend of from 0.5 to about 50 weight percent of glycerol and from 99.5 to about 50 weight percent of a glycol ether having the formula $R(OCH_2CH_2)_xOH$ wherein: R is selected from the group consisting of a hydrogen atom, methyl, ethyl, propyl, butyl, phenyl, and tolyl groups; when R is hydrogen, $x$ is an integer of from 2 to 4; and when R is other than hydrogen, $x$ is an integer of from 1 to 4.

17. In the method of operating a jet engine which encounters subfreezing temperatures, said engine being equipped with a fuel supply system which is subject to becoming plugged by ice formation at said subfreezing temperatures due to the presence of water in the fuel, the step of passing through said fuel supply system to a combustion zone of said engine a liquid hydrocarbon fuel containing from 0.01 to 1 volume percent of an anti-icing additive comprising a blend of from 0.5 to about 50 weight percent of a saturated acyclic polyhydroxy alcohol containing from 3 to 5 carbon atoms, from 2 to 5 OH groups each attached to a different carbon atom and wherein the ratio of OH groups to carbon atoms is in the range of 0.66:1 to 1:1; and from 99.5 to about 50 weight percent of ethylene glycol monomethyl ether.

18. In the method of operating a jet engine which encounters subfreezing temperatures, said engine being equipped with a fuel supply system which is subject to becoming plugged by ice formation at said subfreezing temperatures due to the presence of water in the fuel, the step of passing through said fuel supply system to a combustion zone of said engine a liquid hydrocarbon fuel containing from 0.01 to 1 volume percent of an anti-icing additive comprising a blend of from 0.5 to about 50 weight percent of a saturated acyclic polyhydroxy alcohol containing from 3 to 5 carbon atoms, from 2 to 5 OH groups each attached to a different carbon atom and wherein the ratio of OH groups to carbon atoms is in the range of 0.66:1 to 1:1; and from 99.5 to about 50 weight percent of diethylene glycol monomethyl ether.

19. In the method of operating a jet engine which encounters subfreezing temperatures, said engine being equipped with a fuel supply system which is subject to becoming plugged by ice formation at said subfreezing temperatures due to the presence of water in the fuel, the step of passing through said fuel supply system to a combustion zone of said engine a liquid hydrocarbon fuel containing from 0.01 to 1 volume percent of an anti-icing additive comprising a blend of from 0.5 to about 50 weight percent of glycerol and from 99.5 to about 50 weight percent of ethylene glycol monomethyl ether.

20. In the method of operating a jet engine which encounters subfreezing temperatures, said engine being equipped with a fuel supply system which is subject to becoming plugged by ice formation at said subfreezing temperatures due to the presence of water in the fuel, the step of passing through said fuel supply system to a combustion zone of said engine a liquid hydrocarbon fuel containing from 0.01 to 1 volume percent of an anti-icing additive comprising a blend of from 0.5 to about 50 weight percent of glycerol and from 99.5 to about 50 weight percent of diethylene glycol monomethyl ether.

21. In the method of operating a jet engine which encounters subfreezing temperatures, said engine being equipped with a fuel supply system which is subject to becoming plugged by ice formation at said subfreezing temperatures due to the presence of water in the fuel, the step of passing through said fuel supply system to a combustion zone of said engine a liquid hydrocarbon fuel containing from 0.01 to 1 volume percent of an anti-icing additive comprising a blend of from 1 to about 10 weight percent of glycerol and from 99 to about 90 weight percent of ethylene glycol monomethyl ether.

22. In the method of operating a jet engine which encounters subfreezing temperatures, said engine being equipped with a fuel supply system which is subject to becoming plugged by ice formation at said subfreezing temperatures due to the presence of water in the fuel, the step of passing through said fuel supply system to a combustion zone of said engine a liquid hydrocarbon fuel containing from 0.01 to 1 volume percent of an anti-icing additive comprising a blend of
  from 1 to about 10 weight percent of glycerol and
  from 99 to about 90 weight percent of diethylene glycol monomethyl ether.

23. A composition suitable for reducing ice formation in hydrocarbon fuels when added thereto so as to prevent ice plugging of a jet engine filter through which such fuel may be passed, comprising from 99 to about 60 weight percent of ethylene glycol monomethyl ether; and from 1 to about 40 weight percent of glycerol, said glycerol being present in an amount sufficient to protect fuel tank linings from the solvent effects of said ether.

References Cited in the file of this patent

UNITED STATES PATENTS

| | | |
|---|---|---|
| 2,104,021 | Callis | Jan. 4, 1938 |
| 2,722,099 | Wasserbach | Nov. 1, 1955 |
| 2,952,121 | Mitacek | Sept. 13, 1960 |

FOREIGN PATENTS

| | | |
|---|---|---|
| 766,591 | Great Britain | Jan. 23, 1957 |

UNITED STATES PATENT OFFICE
CERTIFICATE OF CORRECTION

Patent No. 3,032,971                        May 8, 1962

James A. Shotton

It is hereby certified that error appears in the above numbered patent requiring correction and that the said Letters Patent should read as corrected below.

Columns 7 and 8, footnote "1", under Table II, for "nonomethyl" read -- monomethyl --; column 13, line 28, for "on" read -- of --.

Signed and sealed this 2nd day of October 1962.

(SEAL)
Attest:

ERNEST W. SWIDER
Attesting Officer

DAVID L. LADD
Commissioner of Patents